United States Patent [19]
Vogt

[11] Patent Number: 5,408,896
[45] Date of Patent: Apr. 25, 1995

[54] POWER TRANSMISSION DRIVE SYSTEM

[75] Inventor: Kurt E. Vogt, Crestline, Ohio

[73] Assignee: MTD Products Inc, Cleveland, Ohio

[21] Appl. No.: 39,630

[22] Filed: Mar. 30, 1993

[51] Int. Cl.[6] .............................................. F16H 3/14
[52] U.S. Cl. ..................................................... 74/361
[58] Field of Search ................. 74/322, 361, 355, 356, 74/333, 335

[56] References Cited

U.S. PATENT DOCUMENTS

| | | | |
|---|---|---|---|
| 4,138,006 | 2/1979 | Benson, Jr. | 74/361 XR |
| 4,344,337 | 8/1982 | Nagasaki et al. | 74/322 XR |
| 4,464,947 | 8/1984 | Windor-Smith et al. | 74/356 XR |
| 4,484,488 | 11/1984 | Kato et al. | 74/361 OR |
| 4,805,473 | 2/1989 | Bower | 74/361 OR |

Primary Examiner—Dirk Wright
Attorney, Agent, or Firm—Lightbody & Lucas

[57] ABSTRACT

A pivotable actuator for changing the condition of a mechanical power transmission system between neutral, engaged and disengaged states. The transmission system comprises rotary shafts each having a clutch mechanism and a clutch actuator for engaging and disengaging the clutch mechanism. A bearing device disposed about the shafts is moved by a shift mechanism to drive the clutch actuator between the different states. In an alternative embodiment relating to an aligned shaft drive system, the clutch actuator shifts a gear drive system from an engaged condition to a neutral condition and then to a braked condition.

24 Claims, 4 Drawing Sheets

POWER TRANSMISSION DRIVE SYSTEM

FIELD OF THE INVENTION

This invention relates to actuators for power transmissions and drive systems and more particularly, to a pivotable actuator for changing the condition of mechanical power transmissions and drive systems between power conditions such as neutral, forward, reverse, and/or braked states. In one embodiment, the actuator shifts a drive system from an engaged condition to a neutral condition and then to a braked condition.

BACKGROUND OF THE INVENTION

Prior art mechanical power transmissions and drive systems typically incorporate a clutch mechanism for transmitting power between power transmitting, rotary shafts. These prior art systems have limited applications because of their inability to easily shift between different conditions. When used with machines, such as power lawn mowers, it is particularly desirable for the operator to easily shift between the various operating conditions such as forward, neutral, and reverse in an easy, quick, and precise manner. Also, considerable effort to improve the braking system is being expended by manufacturers of the small machines discussed herein. For reasons of economy, the low power systems associated with riding and walk behind lawn mowers and the like, typically use mechanical actuators to engage and disengage the power source from the power drive system, as well as to reverse direction of the output shaft from the transmission. However, these mechanical actuators are somewhat complicated to operate. Since these relatively small machines are operated by a wide range of people, including many with little or no experience in operating machines, a safe, easy to operate and relatively inexpensive actuating system is extremely important.

OBJECTS AND SUMMARY OF THE INVENTION

It is an object of the present invention to provide an improved actuator for power transmissions and drive systems which obviates the problems and limitations of the prior art systems.

It is another object of the present invention to provide an improved, pivotable actuator for power transmissions and drive systems which is easily shifted to change the operating conditions.

It is still another object of the present invention to provide an improved actuator for power transmissions and drive systems which can quickly and easily shift between drive, neutral and reverse conditions.

It is yet another object of the present invention to provide an improved actuator for power transmissions and drive systems which can easily shift between an engaged, a neutral and a disengaged braked condition while avoiding simultaneous actuation thereof.

It is still further another object of the present invention to provide an improved actuator for power transmissions and drive systems which is easy to assemble and relatively inexpensive to manufacture while being sturdy enough to handle rough treatment by inexperienced equipment operators.

In accordance with the invention, a power drive system comprises a first rotary shaft having an actuation mechanism such as a clutch engagedly mounted therearound and an actuator for engaging and disengaging the actuation mechanism. A bearing device is disposed about the shaft and abutted against the actuator. A shift mechanism is disposed directly or indirectly against the bearing device for movement whereby the bearing device positions the actuator between a neutral position wherein the mechanism is disengaged and an operating position wherein the mechanism is engaged. The actual preferred pivoting function can be caused by the preferred rotary shafts with flats (which are easy to make, use, and seal once installed) or an alternate mechanism such as levers, cables, push rods or other force passing system, either singly or in multiples. Multiple actuation mechanisms can be actuated by using series or parallel mounted systems.

Preferably, the bearing device of the power drive system comprises an angular thrust ball bearing assembly, including concentric inner and outer bearing races with a plurality of ball bearings therebetween. The two races are non-symmetrical in cross section having a raised portion on one lateral side in order to efficiently transfer the actuation forces angularly between the races through the ball bearings. The inner bearing race is mounted surrounding the first rotary shaft. One race, preferably the outer race, is moved by the shift mechanism to position the actuator between the neutral and operating positions whereby the actuation mechanism is either engaged or disengaged via the other bearing race, preferably the inner race. This use of a ball bearing is preferred due to low cost and simplicity as well as a possible dual shaft support and activation function for the bearing. Also, there can be a single inventory of bearings. Alternately, axial thrust bearings, roller bearings, or other types of bearings could be utilized to transfer the described axial movement between stationary and rotating parts.

Further in accordance with one embodiment of the invention, a power transmission comprises two neighboring axially aligned rotary shafts and two actuation mechanisms. A first rotary shaft has a first clutch mechanism mounted therearound. A first clutch actuator, in cooperative relationship with a first clutch mechanism, engages and disengages the first clutch mechanism. A drive gear mechanism, mounted to the second shaft, is drivingly interconnected with the first clutch actuator for transmitting rotary power in one direction to the second rotary shaft whenever the first clutch actuator is engaged with the first clutch mechanism. A second rotary shaft, spaced from the first rotatable shaft, has a second clutch mechanism mounted therearound which is in cooperative relationship with a second clutch mechanism for engaging and disengaging the second clutch mechanism. An idler gear device interconnects the first rotary shaft to the second clutch actuator for transmitting rotary power in the other forward rotary direction from the first rotary shaft to the second rotary shaft whenever the second clutch actuator is engaged with the second clutch mechanism.

A shift mechanism is interconnected with the first and second clutch actuators. The shift mechanism has a neutral position for rotary movement of the first shaft without rotary movement of the second shaft, a forward position for rotary movement of the second shaft in one direction and a reverse position for rotary movement of the second shaft in the other direction. The shift mechanism includes a first bearing device of the transmission that abuts against the first clutch actuator for rotatably supporting the clutch actuator and a second bearing device that abuts against and rotatably supports the second clutch actuator. The first bearing device comprises a first ball bearing assembly, including concentric inner and outer bearing races with a plurality of ball bearings therebetween. The inner race is mounted about the first rotary shaft and the outer race is moved by the shift device to position the clutch actuator through the inner race to the neutral position where power is not transmitted to the second shaft and in the operating position where the first clutch mechanism is engaged and the second shaft rotates in the forward direction. The second bearing assembly is substantially identical with the first bearing assembly in respect to the second clutch mechanism.

Also in accordance with the invention, the shift device within the transmission includes a shift yoke that is pivotally actuated to engage the outer bearing race of the first ball bearing assembly without engaging the inner bearing race to drive the clutch actuator. The shift device is likewise pivotally actuated by another shift yoke to engage the outer bearing race of the second ball bearing assembly without engaging the inner bearing race to second clutch actuator.

In accordance with another embodiment of the invention, a power drive and brake system comprises first and second axially aligned series mounted rotary shafts, a clutch device for transmitting power between the first and second shafts, a brake mechanism for stopping the second rotary shaft, an actuator for engaging and disengaging the clutch device and brake mechanism, and a shift mechanism for moving the actuator. The shift mechanism has an engaged position where the clutch device is engaged and the brake mechanism is disengaged, a neutral position wherein both the clutch device and the brake mechanism are disengaged and a braked position where the clutch device is disengaged and the brake mechanism is engaged. In the embodiment disclosed, the power drive and brake system also includes a clutch brake carrier operatively secured to both the clutch device and the brake mechanism. A spring is preferably provided to bias the clutch brake carrier in a direction to engage the clutch device and transmit power between the first and second rotary shafts to provide for the engaged condition.

The shift mechanism of the power drive and brake system is pivoted between the engaged position, the neutral position and the braked position to indirectly move the clutch brake carrier through a cylindrical sleeve and a thrust bearing from the engaged position where the clutch mechanism is engaged and power is transmitted from the first rotary shaft to the second rotary shaft, to the neutral position where the clutch mechanism the brake mechanism are disengaged allowing rotary movement of the first rotary shaft and independent rotary movement of the second rotary shaft, to the braking position where the brake mechanism is engaged and the clutch mechanism is disengaged for rotary movement of the first rotary shaft while the second rotary shaft is braked to stop rotary movement.

The clutch device of the power drive and brake system includes first interleaved, multiple friction plates mounted about the first shaft, and the brake mechanism includes second interleaved, multiple friction plates mounted about the second shaft whereby movement of the clutch brake carrier towards the clutch mechanism compresses the first interleaved, multiple friction plates and movement of the clutch brake carrier towards the brake mechanism compresses the second interleaved, multiple friction plates. Brake adjustment components are provided for adjusting the distance between the second interleaved, multiple friction plates.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
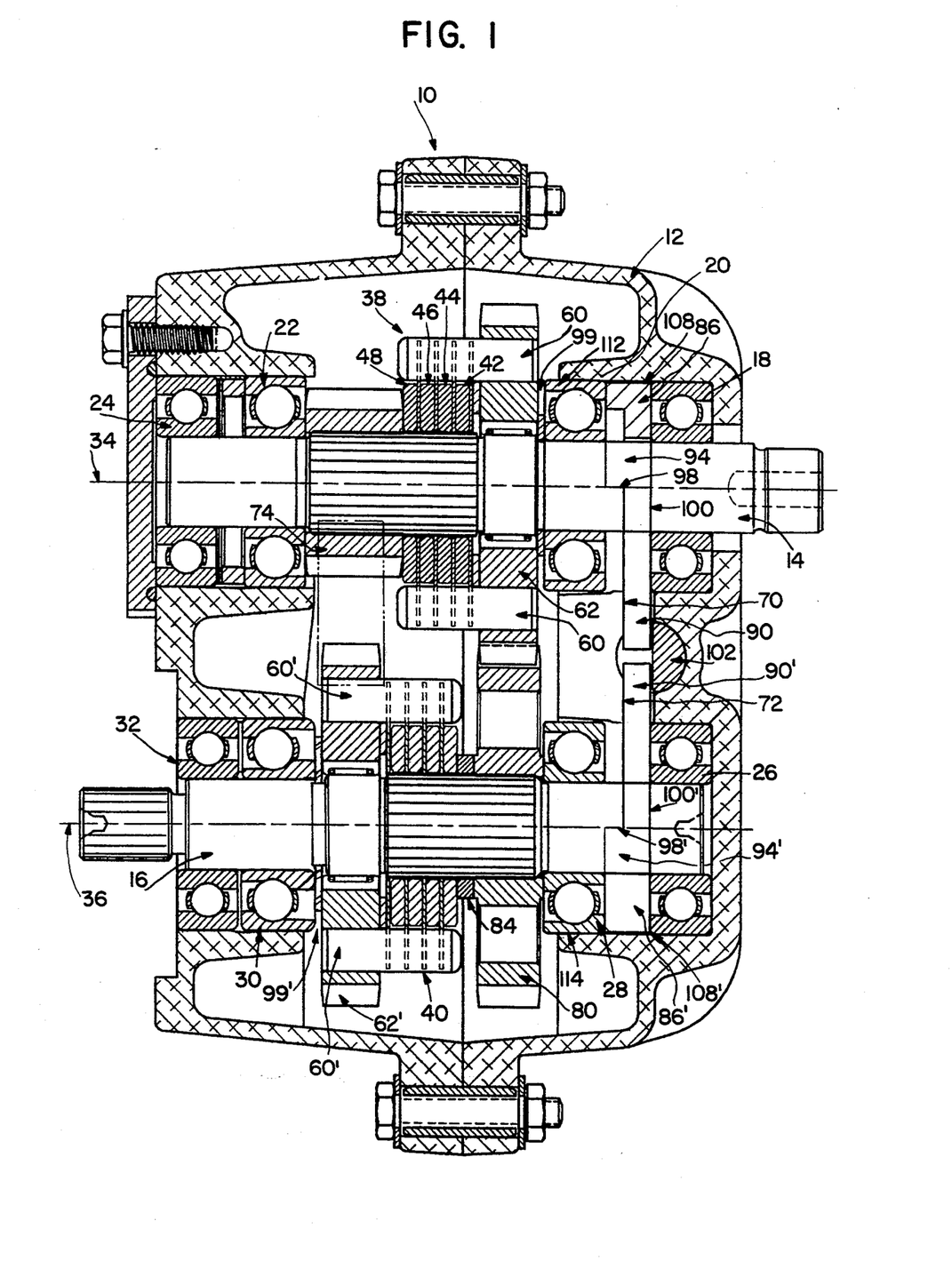
FIG. 1 a top elevation, partially cross sectioned view of a power transmission, having forward, neutral, and reverse condition in accordance with the present invention.

Referring to FIG. 1, there is illustrated a power drive system such as a power transmission 10 including a housing 12 with power transmitting rotary or rotatable shafts 14 and 16 mounted therein. The rotary shafts 14 and 16 are typically input and output shafts, respectively, and are arranged with their rotary axis in spaced, neighboring, parallel relation with respect to one another. Shafts 14 and 16 are rotatably journalized in conventional, anti-friction bearing assemblies 18, 24, 26, and 32 (18–32). While non-inset ball bearings are illustrated, it is within the terms of the invention to substitute any type of conventional anti-friction bearing. These bearings could be eliminated if desired with the actuating bearings providing the support for the shafts 14 and 16. Bearings 20, 22, 28, and 30 are also mounted to serve an additional function of actuating an element movable in the direction of the axes 34 and 36 through power shafts 14 and 16, respectively, as discussed in detail hereinafter.

Figure 2:
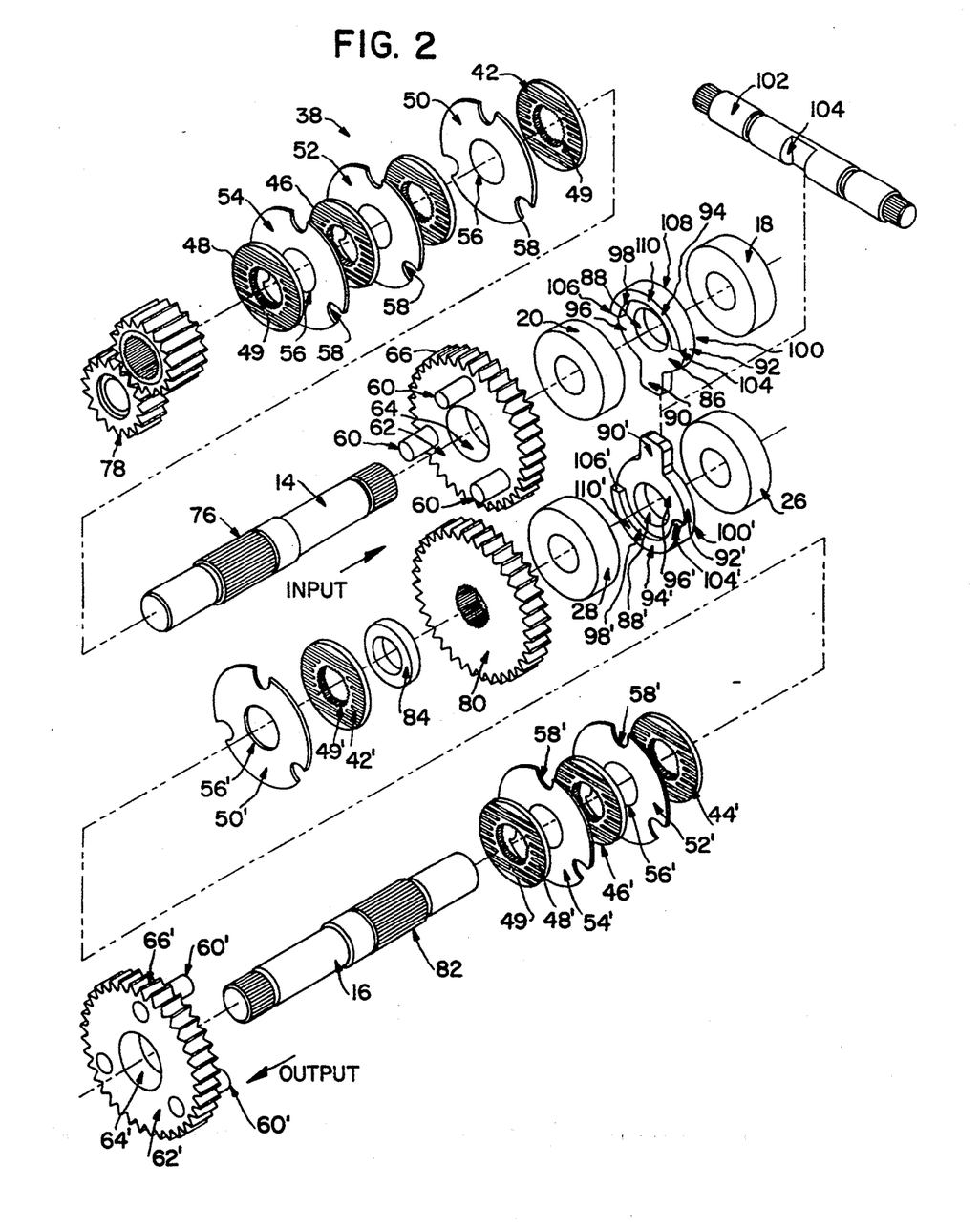
FIG. 2 is a perspective, exploded view of selected transmission components of FIG. 1 relating to the clutch and shifting mechanism.

Actuation mechanisms 38 and 40, as illustrated in FIG. 2, are mounted about shafts 14 and 16, respectively, and include many identical components in their construction. The actuation mechanisms 38 and 40, in the preferred embodiment, are interleaved, multiple friction plate clutches which include a plurality of friction discs 42,44,46,48 (42–48) and 42',44',46',48' (42'–48') having circular through bores 49 and 49', respectively therethrough Throughout the specification, where elements are substantially identical, prime numbers are used to indicate like elements having identical unprimed numbers. The friction discs 42–48 and 42'–48' are drivingly but slidingly mounted on shafts 14 and 16, respectively by a spline interface. Interleaved between the friction discs 42–48 and 42'–48' are clutch plates 50,52,54 and 50',52',54' having circular through bores 56 and 56', respectively, therethrough for slidable non-driving mounting on shafts 14 and 16, respectively. Clutch plates 50,52,54 (52–54) and 50',52',54' (52'–54') have a plurality of grooves 58 and 58', generally semi-circular, and spaced about the outer edge surface of the clutch plates to drivingly engage clutch pins 60 and 60' protruding outward from the face of clutch carriers 62 and 62' so as to interconnect the clutch plates to their respective gears 62, 62' as later described, respectively. Each of the clutch carriers 62 and 62' is a gear having a circular through bores 64 and 64' for a sliding non-driving mounting on shafts 14 and 16, respectively, and axial external gear teeth 66 and 66', respectively, about their outer peripheral surfaces. Means 70 and 72, to engage the clutch mechanisms 38 and 40, are an important aspect of the invention and are discussed in detail below.

A gear 74 with axial inner splines around its internal cylindrical surface is drivingly connected to splines 76 about shaft 14 for rotation therewith. In the preferred embodiment, gear 74 can also slide on the shaft 14, more for ease of assembly than anything else. Gear 74 is disposed between and in abutting relation with the inner race of bearing 22 and the end friction plate 48. The other race of the bearing 22 is out of contact with the gear 74 for reasons later set forth. This outer race of bearing 22 is supported to the outer race of the bearing 24 by large diameter washers. This allows for the rotation of the inner race of bearing 22 in respect to the outer race. An idler gear 78, as seen in FIG. 2, is rotatively mounted to the case of the transmission 10 by a fixed idler shaft drivingly engaged to both the gear 74 and the gear teeth on clutch carrier 62', as discussed in more detail hereinafter for transmitting same direction rotary movement therebetween.

A gear 80, having axial inner splines around its internal cylindrical surface, is splined, in a known manner, to splines 82 about shaft 16. Gear 80 is disposed between and in abutting relation with the inner race of bearing 28 and a washer 84, which in turn is abutted against the end friction plate 42'. Again, the outer race of bearing 28 is out of contact with the gear 80. Further, gear 80, as seen in FIG. 1, is engaged with the gear teeth on clutch carrier 62.

Means 70 and 72, to engage the mechanisms 38 and 40, include shift yokes 86 and 86' having through bores 88 and 88' which are of a larger diameter than power shafts 14 and 16 that extend therethrough to enable pivotable motion, as discussed below. Shift yokes 86 and 86' are generally cylindrical in shape and include an arm 90 and 90' which extends radially outward from the peripheral edge surface 92, 92' thereof. Further, the shift yokes 86 and 86' include generally semicircular lips 94 and 94' which extend axially outward from side surfaces 96 and 96'. These lips 94, 94' are part of the main activating force mechanism in the preferred embodiment. In this embodiment the outer race of the bearings 28, 28' are the contact surfaces for the lips 94, 94'. For this reason, the lips 94 are outer axial surfaces which extend from and are integral with the peripheral edge surfaces 92, 92' and inner axial surfaces 98 and 98' which are radially spaced from through bores 88 and 88'. With these dimensions, this lip 94, 94' overlaps the outer race of the bearing 20, 28 respectively (but not the inner race for reasons later set forth). Adaptations would have to be made for alternated bearing systems.

The shift yokes 86 and 86' are disposed in power transmission 10 with their side surfaces 100 and 100' abutted against anti-friction bearings 18 and 26, respectively, and their lips 94 and 94' abutted against the outer races of the anti-friction bearings 20 and 28. The free ends of arms 90 and 90' are disposed adjacent to each other so as to provide an actuation point for external control. In the preferred embodiment, a cylindrical shifter 102 is used to move arms 90 and 90'. The cylindrical shifter 102 is supported in the housing 12 and has a notch 104 forming a "D" shaped cam surface which selectively engages the free ends of arms 90 and 90' as later described. Note that the opposite ends 104,106 and 104',106' of lips 94 and 94', respectively, are aligned with the center lines 34 and 36.

When shifter 102, as seen in FIG. 1, is rotated in the counterclockwise direction, the end of arm 90 is raised and pivots the shift yoke 86 about the outer edge surface 108. This pivotable movement presses the outwardly facing axial surface 110 of lip 94 against the outer race 112 of bearing 20. This axially slides the clutch carrier 62 (via the inner race of bearing 20 and an intermediate washer 99) to engage clutch mechanism 38, as discussed more fully below. It is important that the inner race of bearing 20 is not engaged by the shift yoke 86 because otherwise the bearing 20 would be useless as a rotary force passing member. Also, due to the pivoting of the shift yoke 86 to contact the outer race of bearing 18 together with the bore 88 in the center of the shift yoke, there is no interference with this bearing 18 or shaft 14 at this point either.

Conversely, when shifter 102, as seen in FIG. 1, is rotated in the clockwise direction, the end of arm 90' is raised and pivots the shift yoke 86' about the outer edge surface 108'. This pivotable movement presses the outwardly facing axial surface 110' of lip 94' against the outer race 114 of bearing 28. This slides the gear 80 in the axial direction to engage clutch mechanism 40, as discussed more fully below, Here also, the inner race of bearing 28 or bearing 26 is not engaged by the shift yoke 86'. A washer 99' rotatively interconnects the gear 62 to the inner race of the bearing 30 so as to allow the free rotation of such gear 62'. (The outer race of the bearing 30 is supported to the outer race of bearing 32 by larger diameter washers.)

The power transmission 10 of FIGS. 1 and 2 has input and output rotary shafts 14 and 16, respectively, arranged in neighboring axis alignment with each other. Interleaved clutch mechanisms 38 and 40 are mounted around shafts 14 and 16, respectively, and are operated by shift yokes 86 and 86' which in turn are controlled by the cylindrical shifter 102. The arrangement is such that when either clutch mechanism 38 or 40 is engaged, the other is disengaged so that power is transmitted in either one direction or the other direction, as will be more fully explained below. Further, due to the use of a single cylindrical shifter 102 there is a neutral position where neither clutch is engaged, as seen in FIG. 1. This sequential operation is preferred, especially when the transmission is used as a forward/neutral/reverse shift device for lawn mowers. It is understood that while this arrangement transmits a bi-directional flow of power, either shaft can be used as the input shaft while the other is the output shaft.

The transmission 10 shown is utilized as the forward/neutral/reverse mechanism for a lawn mower. In this application, the transmission 10 is bolted onto a speed change main transmission. This is facilitated by the fact that the casing of the transmission 10 has the same general size, shaft location, and mounting bolt orientation as a Sundstrand 10 BDU hydrostatic transmission. This allows a manufacturer to use a single speed change main transmission with both mechanical (the invention) and hydrostatic power inputs. In operation, the transmission 10 has a power input shaft 14 connected to a source of power, such as a motor (not shown), for rotary movement. Due to the ruggedness of the disclosed embodiments of the invention, no clutch is necessary, although one could be utilized if desired. The shaft 16 is drivingly connected to main input of the speed change main transmission. When the cylindrical shifter 102 is in the neutral position, as illustrated in FIG. 1, input shaft 14 rotates gear 74 while clutch carrier 62, which is journalized on the shaft by needle bearings, does not rotate. Concurrently, idler gear 78, as illustrated in FIG. 2, which is meshed with gear 74 and directly or indirectly with the gear teeth on clutch carrier 62', rotates However, since the clutch carrier 62' is journalized on shaft 16 by needle bearings, it does not rotate the shaft 16. This is a neutral no output condition.

When the cylindrical shifter 102 is rotated in the counterclockwise direction, the outer race 112 of bearing 20 is pushed by yoke 86 in an axial direction towards clutch 38. This compresses the friction discs 42–48 to clamp the clutch plates 50–54 and effect a driving connection between shaft 14 and clutch carrier gear 62. Since carrier gear 62 is meshed with gear 80, which in turn is splined onto shaft 16, shaft 16 moves in one direction. This is a first operative driving connection with shaft 16 rotating in the opposite direction as shaft 14.

When the cylindrical shifter 102 is rotated in the clockwise direction, the outer race 114 of bearing 28 is pushed by yoke 86' in an axial direction towards clutch 40. This moves the gear 80 and the washer 84 to compress the friction discs 42'–48' to clamp the clutch plates 50'–54' and effect a driving connection between shaft 16 and clutch carrier gear 62'. Since carrier gear 62' is meshed with idler gear 78, which in turn is meshed to gear 74 splined onto shaft 16, shaft 16 moves in the other direction. This is a second operative driving condition with shaft 16 rotating in the same direction as shaft 14, at a lower speed due to the diameter of gear 74 versus gear 62. This provides for a lower speed in this direction (reverse) for the particular transmission 10 disclosed. Differing ratios or interconnections could be selected for either mechanism as desired.

One important advantage of transmission 10 is that while it is a mechanical transmission, it has the operating characteristics of a hydraulic transmission in that it can be shifted under load and has an intermediate neutral condition. Besides being sturdy and dependable, transmission 10 is relatively inexpensive to manufacture and assemble. It is also a suitable, inexpensive replacement for a conventional Sundstrand 10-BDU hydrostatic power unit as previously set forth.

In the embodiment of FIGS. 1 and 2, there are two neighboring shafts with two separate yokes 86, each establishing a single power condition.

Figure 3:
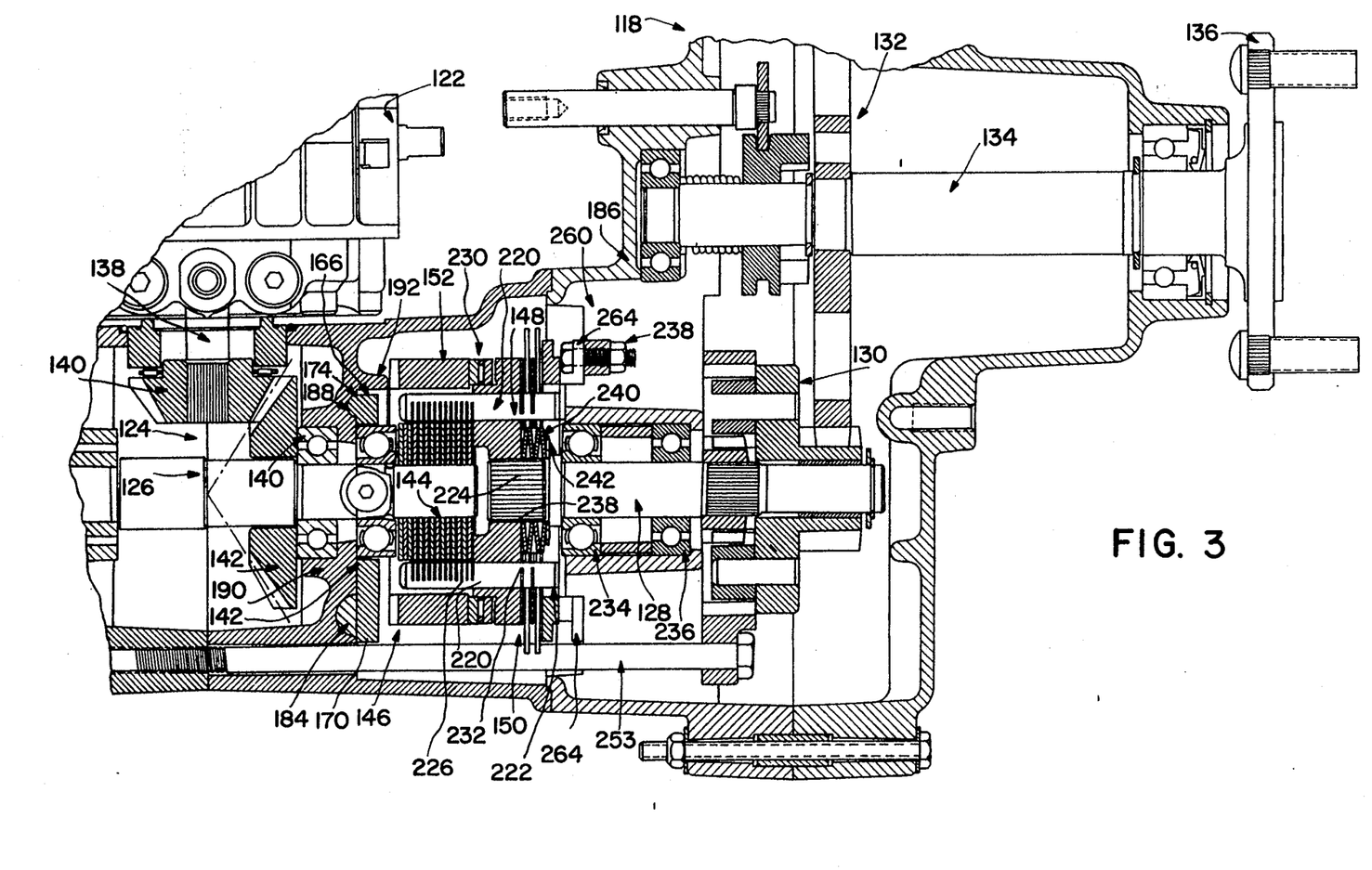
FIG. 3 illustrates a partially cross sectioned, side elevational view of a power drive system having clutched, neutral, and brake conditions in accordance with the present invention; and, FIG. 4 is a perspective, exploded view of the clutch brake components and shifting mechanism of FIG. 3.
Figure 4:
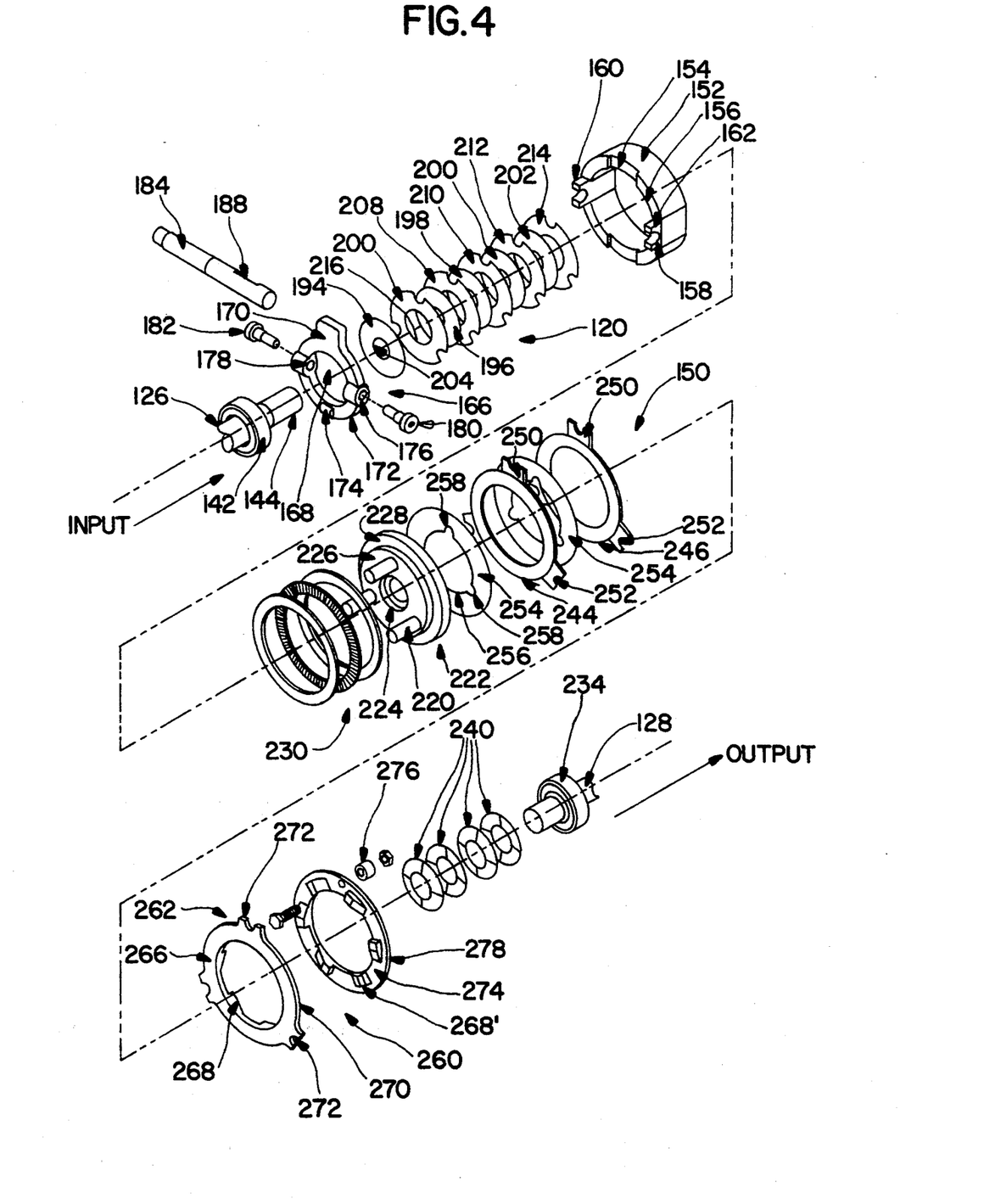

Referring to FIGS. 3 and 4, a second embodiment of the invention relates to a power drive system 118 which incorporates the invention as a sequential clutch brake device 120 disposed between a multi-speed power unit 122, such as a Sundstrand 10-BDU hydrostatic power unit, and an output. In this instance, the output is a first stage planetary reduction unit 130, a second stage Bull reduction gear 132 and an axle 134 with a drive wheel 136 attached to the output end. Since the primary invention is directed to the clutch brake device 120, the other components of the system and their operation are only described briefly herein. The central shaft is illustrated via a power drive and brake system associated with one drive wheel. A duplicate mirror image power drive and brake system associated with another drive wheel is connected to an opposite end of the central shaft but not illustrated herein.

Power from power unit 122 is delivered through a shaft 138 to gear drive unit 124 which includes meshed bevelled gears 140 and 142. Bevelled gear 142, which is secured to central shaft 126 by conventional means, such as splines, drives the central shaft 126. Central shaft 126 is supported by conventional anti-friction bearing assemblies 140 and a bearing (not shown) in the mirror image power drive. Components of the clutch brake device 120 are generally about the free splined end 144 of shaft 126, as described in more detail below.

The clutch brake device 120 includes operator means 146 having three operational positions where a clutch mechanism 148 is engaged and a brake mechanism 150 is disengaged, where both the clutch and brake mechanisms are both disengaged and where brake mechanism 150 is engaged and clutch mechanism 148 is disengaged. Operator means 146, as shown in FIG. 4, generally includes a cylindrical sleeve 152, a shift yoke 166 and a cylindrical shifter 184.

Cylindrical sleeve 152 has a slot 154 cut in end face 156 and oppositely disposed support arms 158 and 160 extending axially outward from face 156 and having U-shaped grooves 162 and 164 at the free ends thereof. The shift yoke 166 is disposed between support arms 158 and 160 and is secured to slots in the cylindrical sleeve 152 by radially extending bolts 180, 182. These bolts 18, 182 serve the dual purpose of passing actuation forces between the yoke 166 and sleeve 152 as well as physically supporting the sleeve 152 as later described. The shift yoke 166 has a through bores 168 which is of a larger diameter than shaft 144 extending therethrough to enable pivotable motion when assembled, as discussed below.

Shift yoke 166 is generally cylindrical in shape and includes an arm 170 extending radially outward from the peripheral edge surface 172. Further, the shift yoke 166 includes a boss 174 disposed on the surface of the yoke on the opposite side of through bore 168 from arm 170. This boss 174 provides a pivoting bearing surface which also physically locates the shift yoke 166 in position as later described. Also, opposing threaded bores 176 and 178 extending radially through the sidewalls of the yoke to the through bores 168. Bolts 180 and 182 are threaded into bores 176 and 178, respectively, so that the yoke can be connected to sleeve 152 with the bolts in U-shaped grooves 162 and 164. The arm 170 is disposed within the groove 154 in an unactuated condition.

A cylindrical shifter 184 is rotatably supported in the housing 186 of the power drive and brake mechanism 118 and has a notch 188 forming a "D" shaped cam surface. This notch 188 engages the arm 170 of shift yoke 166 to pivot the shift yoke about boss 174, as discussed hereinafter. The assembled sleeve 152 and shift yoke 166 are installed in the housing so that boss 174 is received within an indentation 188 formed in an interior wall 190 of housing 186 so as to form a pivoting bearing surface. This spreads out the load between the shift yoke 166 and housing 186 more than a flat surface (set forth in the first embodiment) would do. The boss 174 also serves to retain the shift yoke 166 in its operative position in respect to the housing of the device 120 (together with bearing 142). Note that sleeve 152 abuts against interior wall 192 of housing 186 in its default, unactuated condition. This provides for a definite default positioning for the mechanism.

Clutch mechanism 148 is mounted about central shaft 126 can be a multiple friction plate clutch which includes a plurality of friction discs 194, 196, 198, 200, 202 (194–202) having circular through bores 204 therethrough. Friction discs 194–202 are slidingly mounted on the end 144 of shaft 126 connected thereto for rotation therewith by splines. Interleaved between the friction discs 194–202 are clutch plates 206, 208, 210, 212, 214 (206–214) having circular through bores 216 therethrough. Clutch plates 206–214 have a plurality of outer grooves 218 which are generally semicircular, and spaced about the outer edge surface of the plates to engage pins 220 protruding outward from opposite sides of a clutch brake carrier 222. A bearing 142 loosely positioned in the interior hole 168 of the yoke 166 acts to provide a rotating interconnection between the friction disk 194 (bearing inner race) and the housing of the device (bearing outer race). This passes the spring biasing forces to the stationary housing of the transmission while still allowing for the rotation of the shafts. The bearing 142 also insures the rough positioning of the yoke 166 about the shaft 126.

The clutch brake carrier 222 is a generally cylindrical element having a circular through bores 224 which is sized for a driving but also sliding fit on the splined end of shaft 128. One side 226 of carrier 222 has a circular groove 228 to support a radial thrust bearing assembly 230 which in turn abuts against sleeve 152. Note that in the preferred embodiment the pins 220 jut outward from the other side 232 of clutch carrier 222 and thus also form part of the operating components of brake mechanism 150, as discussed in detail hereinafter.

Outer drive shaft 128 is supported by conventional anti-friction bearing assemblies 234 and 236 and has components of the clutch brake device 120 secured to and generally about the free splined end 238 thereof. A compression spring 240, secured at one end by a ring element 242, abuts against side 232 of carrier 222 and biases the carrier against assembled clutch plates and friction discs to compress the clutch assembly against bearing 142. This spring biased clutch drivingly connects drive shaft 128 with the shaft 126, as described in more detail below. This provides a default power interconnection between shafts 126 and 128. Note that due to this default spring loaded engaged condition, no clearance adjustment mechanism is needed for the clutch mechanism 148.

Brake mechanism 150 is mounted about outer drive shaft 128 and can include a multiple friction plate brake which includes a plurality of friction discs 244 and 246 having circular through bores 248 therethrough and three equally spaced shoulders 250 having a U-shaped groove 252 for securing the discs within housing 186 by means such as bolts 253 disposed about the interior of the casing. In the preferred embodiment, the bolts 253 also hold the case together. Friction discs 244 and 246 are slidingly mounted about the pins 220 with brake plates 254 interleaved between the friction discs 244 and 246 and having circular through bores 256 therethrough. Brake plates 254 have a plurality of spaced grooves 258 which are generally semicircular, and spaced about the through bores 256 to align with and slidingly engage pins 220 protruding outward from side 232 of brake carrier 222. This locks the brake plates 254 to the carrier 222 for rotation therewith. In general, when sleeve 152 is moved axially against thrust bearing 230, the clutch brake carrier 222 presses brake friction discs 244 and 246 against brake plates 254 and thereby stops the rotation of shaft 128. This provides a braking condition for the mechanism 118. Note that this second embodiment utilizes an intermediate part, the sleeve 152, between the yoke 166 and the carrier 222. This allows the yoke 166 to be axially displaced from the bearing device for the mechanism (in contrast with the neighboring positioning in the first embodiment. The specifics of the release of the clutch and the application of the brakes will be discussed in greater detail below.

Another aspect of the invention is the provision of a brake adjustment mechanism 260, as best seen in FIG. 4. The adjustment mechanism 260 includes two adjustment discs 262 and 264 which abut against each other. Disc 262 has a flat surface 266 on one side and a plurality of spaced, ramped bosses 268 projecting axially outward on the opposite side 270. Three equally spaced shoulders 272, each having a U-shaped groove, secure discs 262 in place against rotation with means such as bolts 253 displaced about the interior of the casing. Disc 264 has a surface 274 with a plurality of spaced, ramped bosses 268' projecting axially outward therefrom. An adjustment element 276, such as a bolt within a cylinder projecting axially outward from an opposite surface 278, is secured to disc 264.

When the adjustment mechanism 260 is assembled in housing or casing 186, as illustrated in FIG. 3, the flat surface 266 of disc 262 abuts against friction disc 246 with the inner facing surfaces 270 and 274 adjacent each other so that the ramps on opposite facing ramped bosses 268 and 268' abut against each other while the flat surface 278 of disc 264 abuts against the housing 186. An adjustment bolt 290 protrudes from the exterior of the housing inward to contact the adjustment element 276. Rotation of this bolt 290 thus rotates disk 264 in respect to disk 262 so as to alter the axial spacing between the outward faces of disks 264 and 262 (thus increasing the relative thickness of the combination), This in turn adjusts the clearances in the brake mechanism 150. When the power drive system 118 is first assembled, the adjustment bolt 290 is utilized to rotate disk 264 in respect to disk 262 so that there is a neutral condition between release of the clutch mechanism 148 and application of the brake mechanism 150. The bolt 290 is then locked in place. This provides for a sequential operation with the extent of the intermediate neutral condition dependent on the value of the clearances between plates in the brake mechanism 150. When the brakes need adjustment, such as when they become worn, the adjustment bolt 290 can be again utilized in the field to cause movement of disc 264 with respect to stationary disc 262 and thus the latter disc against the brake discs and friction plates to adjust them so that a differing, normally less movement is necessary to apply the brakes.

In operation, the power drive and brake mechanism 118 has a power input shaft 138, which is powered by means such as a power unit 122, that transmits power through a gear drive unit 124 to central shaft 126. When cylindrical shifter 184 is in the default drive position, as illustrated in FIG. 3, compression spring 240 biases clutch brake carrier 222 against clutch mechanism 148 so that rotary power is transferred through the clutch mechanism 148 and clutch brake carrier to drive shaft 128. The power is then transferred through a conventional, first stage planetary reduction unit 130, typically operating at a reduction ratio of 3 to 1, to a second stage full reduction gear 132. Then the power is directed through an axle 134 to a wheel 136.

When the shifter 184 is first rotated, the arm 170 is moved axially towards sleeve 152 and causes the sleeve to move against the bearing 230 which in turn moves the clutch brake carrier 222 against the compression spring 240 whereby the clutch is disengaged so that power is not delivered from the rotating central shaft 126 to outer shaft 128. In this neutral position, the brake is preferably not yet applied so that the wheel 136 turns freely. The bearing 230 utilized is preferably a thrust bearing due to its significant diameter.

When the shifter 184 is rotated further, arm 170 is moved further causing sleeve 152 to move clutch brake carrier 122 to compresses the brake mechanism 150 and stop the outer axle 128 from rotating. This in turn stops wheel 136 from rotating, thus providing a brake condition.

Note that due to the use of two clutch brake devices 120, one for either wheel drive, with no intermediate differential, the clutch brake devices 120 can be utilized together, to brake the lawn mower, or individually, to turn the lawn mower towards the activated side. It is apparent that there has been provided in accordance with this invention an improved actuator for power transmissions and planetary drive systems that satisfies the objects, means and advantages set forth herein before. That is, the transmission and planetary gear drive systems can be quickly and easily shifted between operating conditions, such as between drive, neutral and reverse conditions or between a drive, a neutral or a braked condition. Further, the transmission and planetary gear drive systems are relatively inexpensive and easy to manufacture and assemble while being sturdy to handle rough treatment by inexperienced equipment operators.

While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and broad of the appended claims.

What is claimed:

1. A power drive system, comprising:
   a first rotary shaft having an actuation mechanism engagedly mounted therearound;
   actuator means for engaging and disengaging said actuation mechanism;
   said actuation means including a pivoting yoke;
   bearing means disposed about said first rotary shaft and abutted against said yoke of said actuator means;
   gear means, said gear means being disposed about said first rotary shaft and abutted against said bearing means; and,
   shift means for selectively causing pivotable movement of said yoke whereby said gear means and said bearing means are moved between positions including a neutral position wherein said actuator mechanism is disengaged and an operating position wherein said actuation mechanism is engaged.

2. A power drive system, comprising:
   a first rotary shaft having an actuation mechanism engagedly mounted therearound;
   actuator means for engaging and disengaging said actuation mechanism;
   said actuation means including a pivoting yoke;
   bearing means disposed about said first rotary shaft and abutted against said yoke of said actuator means;
   said bearing means comprising a ball bearing assembly, including concentric inner and outer bearing races with a plurality of ball bearings therebetween;
   shift means for selectively causing pivotable movement of said yoke whereby the yoke moves one bearing race with the other race moving said actuation mechanism between positions including a neutral position wherein said actuation mechanism is disengage and an operating position wherein said actuation mechanism is engaged.

3. A power drive system, comprising:
   a first rotary shaft having an actuation mechanism engagedly mounted therearound;
   actuator means for engaging and disengaging said actuation mechanism;
   said actuation means including a pivoting yoke;
   bearing means disposed about said first rotary shaft and abutted against said yoke of said actuator means;
   shift means for selectively causing pivotable movement of said yoke whereby said bearing means is moved between positions including a neutral position wherein said actuator mechanism is disengaged and an operating position wherein said actuation mechanism is engaged; and,
   said bearing means being an axial thrust bearing assembly.

4. A power drive system, comprising:
   a first rotary shaft having an actuation mechanism engagedly mounted therearound;
   actuator means for engaging and disengaging said actuation mechanism;
   said actuation means including a pivoting yoke;
   bearing means disposed about said first rotary shaft and abutted against said yoke of said actuator means;
   shift means for selectively causing pivotable movement of said yoke whereby said bearing means is moved between positions including a neutral position wherein said actuator mechanism is disengaged and an operating position wherein said actuation mechanism is engaged;
   a second rotary shaft connected to said actuation mechanism, spring means for biasing said actuation means to said operating position to engage said actuation mechanism and transmit rotary power from said first rotary shaft to said second rotary shaft, and
   wherein said shift means moves said actuation means from said operating position to said neutral position to overcome said spring means and disengage said actuation mechanism.

5. The power drive system of claim 4 further including a brake mechanism for braking said second rotary shaft and wherein said shift means in said neutral position does not engage said brake mechanism.

6. The power drive system of claim 5 wherein said shift means further includes a braking position wherein said shift means moves said actuator means from said neutral position to said braking position whereby said actuation mechanism is disengaged and said brake mechanism is engaged.

7. The power drive system of claim 6 wherein said yoke of said shift means is pivoted between said operating, said neutral and said braking positions to move said actuation mechanism from said engaged position where said actuation mechanism is engaged and power is transmitted from said first rotary shaft to said second rotary shaft, to said neutral position where said actuation mechanism and said brake mechanism are disengaged for rotary movement of said first rotary shaft and unpowered, unrestricted movement of said second rotary shaft, to said braking position wherein said brake mechanism is engaged and said actuation mechanism is disengaged for rotary movement of said first rotary shaft while said second rotary shaft is braked to stop rotary movement.

8. A power transmission, comprising:
a first rotary shaft having a first clutch mechanism mounted therearound, a first clutch actuator means in cooperative relationship with said first clutch mechanism for engaging and disengaging said first clutch mechanism;
a second rotary shaft, spaced from said first rotatable shaft, and having a second clutch mechanism mounted therearound, a second clutch actuator means in cooperative relationship with said second clutch mechanism for engaging and disengaging said second clutch mechanism;
idler gear means interconnecting said first rotary shaft to said second clutch actuator means for transmitting rotary power in a one rotary direction from said first rotary shaft to said second rotary shaft whenever said second clutch actuator means is engaged with said second clutch mechanism;
drive gear means mounted to said second shaft being interconnected with first clutch actuator means for transmitting rotary power in another direction to said second rotary shaft whenever said first clutch actuator means is engaged with said first clutch mechanism; and shift means interconnected with said first clutch actuator means and said drive gear means wherein said shift means has a neutral position for rotary movement of said first shaft without rotary movement of said second shaft, a forward position for turning said second shaft in a forward direction and a reverse position for turning said second shaft in a reverse direction.

9. The power drive system of claim 8 including first bearing means abutted against said first clutch actuator means and second bearing means abutted against said drive gear means.

10. The power drive system of claim 9 wherein said first bearing means comprises a first ball bearing assembly, including concentric inner and outer bearing races with a plurality of ball bearings therebetween and wherein one of said bearing races is moved by said shift means to position said clutch actuator means via the other of said bearing races to said neutral position where power is not transmitted to said second shaft and in said operating position where said first clutch mechanism is engaged and said second shaft turns in one direction.

11. The power drive system of claim 10 wherein said second bearing means comprises a second ball bearing assembly, including concentric inner and outer bearing races with a plurality of ball bearings therebetween and wherein one of said outer bearing race is moved by said shift means to position said drive gear means via the other of said bearing races to said neutral position where power is not transmitted to said second shaft and in said operating position where when said second clutch mechanism is engaged and said first clutch mechanism is disengaged said second shaft turns in the other direction.

12. The power drive system of claim 11 wherein said shift means is pivotally actuated to engage the outer bearing race of said first ball bearing assembly without engaging the inner bearing race to drive said clutch actuator means.

13. The power drive system of claim 12 wherein said shift means is pivotally actuated to engage the outer bearing race of said second ball bearing assembly without engaging the inner bearing race to drive said drive gear means.

14. The power drive system of claim 13 wherein said shift means comprises comprise first and second generally shift yokes having first and second bores which receive said first and second rotary shafts, respectively, said bores being larger than said first and second shafts to allow for pivotable movement of said first and second shift yokes with respect to said first and second shafts, respectively.

15. The power drive system of claim 14 wherein said first and second shift yokes each include an upstanding lip about one end to engage said first and second bearing means, respectively, and an axially extending arm to engage said shift means.

16. The power drive system of claim 15 wherein said shift means includes a shifter having three operational positions including a neutral position where neither axially extending arm is moved, a forward position where the arm of the first shift yoke is moved and a reverse position where the yoke arm of the second shift yoke is moved.

17. A power drive and brake system, comprising: a housing;
first and second rotary shafts;
clutch means for transmitting power between said first and second rotary shafts;
brake means extending between said housing and said second rotary shaft for stopping said second rotary shaft;
actuator means for engaging and disengaging said clutch means and said brake means; and
shift means having an engaged position whereby said clutch means is engaged and said brake means is disengaged, a neutral position wherein both said clutch means and said brake means are disengaged and a braked position wherein said clutch means is disengaged and said brake means is engaged.

18. The power drive and brake system of claim 17 further including clutch brake carrier means operatively secured to both said clutch means and said brake means.

19. A power drive and brake system, comprising:
first and second rotary shafts;
clutch means for transmitting power between said first and second rotary shafts;
brake means for stopping said second rotary shaft;
actuator means for engaging and disengaging said clutch means and said brake means;
shift means having an engaged position whereby said clutch means is engaged and said brake means is disengaged, a neutral position wherein both said clutch means and said brake means are disengaged and a braked position wherein said clutch means is disengaged and said brake means is engaged,
a clutch brake carrier means operatively secured to both said clutch means and said brake mean, and spring means for biasing said clutch brake carrier means in a direction to engage said clutch means and transmit power between said first and second rotary shafts.

20. The power drive and brake system of claim 19 wherein said shift means is pivoted between said engaged position, said neutral position and said braked position to move said clutch brake carrier means from said engaged position where said clutch means is engaged and power is transmitted from said first rotary shaft to said second rotary shaft, to said neutral position where said clutch means and said brake mechanism are disengaged allowing rotary movement of said first rotary shaft and unpowered, unrestricted movement of said second rotary shaft, to a braking position wherein said brake means is engaged and said clutch mechanism is disengaged for rotary movement of said first rotary shaft while said second rotary shaft is braked to stop rotary movement.

21. The power drive and brake system of claim 20 further including bearing means between said clutch brake carrier means and said actuator means.

22. The power drive and brake system of claim 21 wherein said bearing means is an axial thrust bearing assembly.

23. The power drive and brake system of claim 20 wherein said clutch means includes first interleaved, multiple friction plates mounted about said first shaft, and said brake means includes second interleaved, multiple friction plates mounted about said second shaft whereby movement of said clutch brake carrier means towards said clutch means engages said clutch means and movement said clutch brake carrier means towards said brake means engages said brake means.

24. The power drive and brake system of claim 20 further including brake adjustment means for adjusting the distance between the second interleaved, multiple friction plates.

* * * * *